United States Patent [19]
Yake

[11] 3,747,971
[45] July 24, 1973

[54] CHAIN HOOK ASSEMBLY
[76] Inventor: Lyle L. Yake, R. R. No. 1, Salem, Ind. 47167
[22] Filed: Apr. 22, 1971
[21] Appl. No.: 136,420

[52] U.S. Cl. ............ 294/82 R, 24/230.5 CR, 59/93
[51] Int. Cl. ............................................ F16g 17/00
[58] Field of Search ...................... 294/78 R, 82 R; 24/230.5 R, 230.5 AD, 230.5 LH, 230.5 CR, 230.5 CS, 230.5 S; 59/84, 85, 87, 93, 95

[56] References Cited
UNITED STATES PATENTS
2,832,628   4/1958   Turnbull ............................. 294/17
932,776   8/1909   Gentner ............................. 294/82 R
1,369,976   3/1921   Lindquist ........................... 294/78 R Primary Examiner—Evon C. Blunk
Assistant Examiner—Johnny D. Cherry
Attorney—Hobbs & Green and Kemon, Palmer & Estabrook

[57] ABSTRACT

A chain hook assembly in which a first hook has a shank with a hole therein, and a second hook has a shank with a part containing two holes spaced longitudinally therealong. A link in the hole in the first hook and in the hole nearer the free end of the second hook interconnects the two hooks and a chain is connected to the second hook by a link in the other of the two holes. The line of force from the first hook to the chain passes through the two holes in the second hook and laterally outwardly from the portion of the hook defining the throat of the second hook, and the throat of the second hook is of a size to receive a link of the chain in a side-wise position without permitting the chain to slide lengthwise therethrough.

4 Claims, 3 Drawing Figures

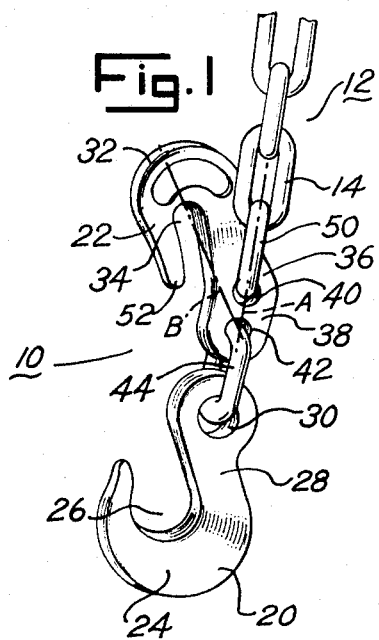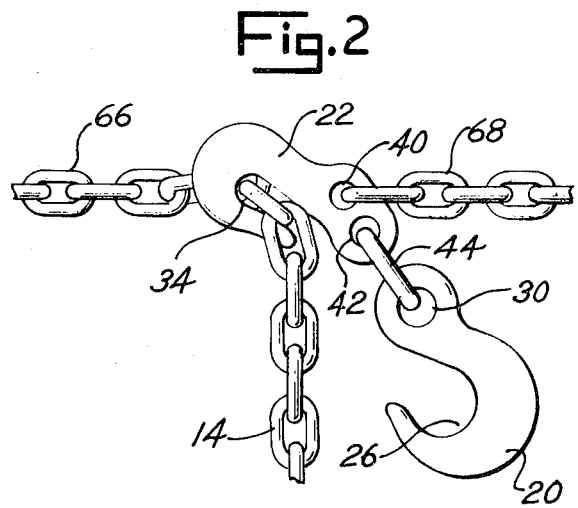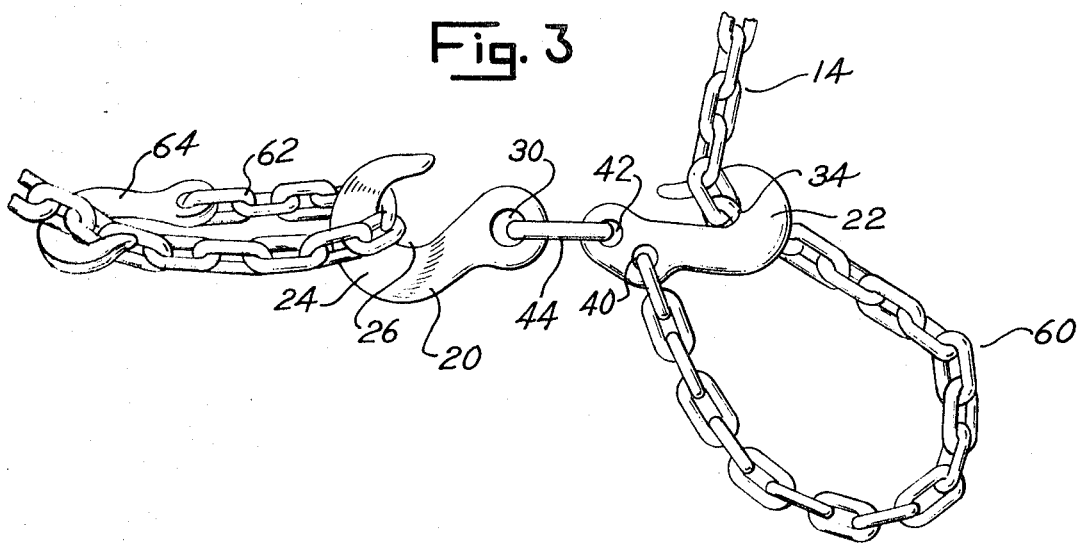

CHAIN HOOK ASSEMBLY

Conventional oval, closed link chains are made in a variety of different sizes and for many different uses and purposes, and are often referred to as log and tow chains. The standard chain of this type has a single hook at one end and another hook or a ring at the other end. The hook used on one end generally is an open or choker type having a relatively large throat through which the chain will readily slide, and the hook used on the other end is the closed or grab type having a restricted throat which will accept and hold a link from the narrow edge but will not permit the adjacent links to slide or otherwise pass therethrough. This standard or conventional combination of hooks on the chain ends has a number of disadvantages which limit the usefulness and versatility of the chain and renders it inconvenient or unsatisfactory for a number of applications and uses in towing, lifting and restraining loads. It is therefore one of the principal objects of the present invention to provide a chain and hook assembly which permits the chain to be used in numerous arrangements with the adjustments for obtaining the various arrangements being performed from one end, and which permits the chain to be used in the conventional manner at any time without interference from other parts of the present novel assembly.

Another object of the invention is to provide a chain hook assembly which enhances the versatility of the chain, permitting easy formation of various connections and different chain lengths, and which is readily adaptable to any conventional oval closed link chain and permits the use of the chain in the conventional manner when required.

Still another object of the invention is to provide a double hook arrangement at one end of the chain, in which one of the hooks may be an open hook and the other hook a closed hook, with the chain so connected to the closed hook that a direct pull is obtained between the open hook and the principal section of the chain when the closed hook is not in use.

A further object is to provide a relatively simple, easily manipulated hook structure which can be readily inserted in a hook and chain assembly and used either alone or in conjunction with the other hook, and which contains a structure for being connected directly to both the principal part of the chain and another hook.

Additional objects and advantages of the invention will become apparent from the following description and accompanying drawing, wherein:

FIG. 1 is a perspective view of a double hook and chain assembly embodying the invention, showing only a portion of an oval link chain;

FIG. 2 is a side elevational view of the chain and hook assembly, illustrating one manner in which the double hook and chain assembly is used; and FIG. 3 is a side elevational view of the double hook and chain assembly shown in the preceding figures, illustrating a further manner in which the double hook assembly is used.

Referring more specifically to the drawing, numeral 10 designates generally the present double hook and chain assembly, numeral 12 indicating a conventional oval, closed link chain, the links being indicated by numeral 14. The chain may be of various sizes and, while the oval link chain is the preferred form for use with the hooks shown, other types of link chains may be used if desired. The type of chain illustrated in the drawings is occasionally referred to and frequently used as a log or tow chain.

The chain assembly illustrated in the drawings basically includes the combination of an open type or choker hook 20 and a closed or grab hook 22, hook 20 having a loop 24 defining a relatively large throat 26 and a shank 28 connected to the loop and having a hole 30 in the free end thereof. The grab hook 22 consists of a loop 32 defining a restricted throat 34 and having a shank 36 with an extension 38 on the free end thereof containing inner and outer holes 40 and 42. In the assembly, the two hooks are preferably connected by a single link 44 extending through hole 30 in hook 20 and through hole 42 in hook 22, the extension 38 forming in effect a link to which the main portion of the grab hook is rigidly secured, and preferably formed integrally therewith. Chain 12 is connected by a link 50 to grab hook 22 with the link extending through hole 40. With this arrangement, a direct line of force is obtained when the chain assembly is attached to a load and a pulling force is applied to the chain. Grab hook 22 is provided with a throat which is sufficiently wide between the shank and prong 52 to slip over and hold any one of the links of the chain in the sidewise position, and yet sufficiently narrow to prevent either of the two adjacent links from slipping or sliding through the throat. Throat 26 of hook 24 is preferably large enough to permit the chain to slide freely therethrough regardless of the position of the links. The manner in which the grab hook 32 is used is illustrated in FIGS. 2 and 3, in which the grab hook is shown containing a link in the throat thereof.

Another important feature of the present invention is the relationship of projection 38 and the holes contained therein. The projection permits the chain to assume a direct pulling action or line of force on hook 20 when hook 22 is not in use, i.e., when only hook 20 and the chain are being used. The direct linkage arrangement between projection 38 and shank 36 of hook 22 retains the hook loop 32 in a firm, relatively fixed, non-interfering position while the choker hook 20 and the chain are used alone. The two hooks and chain may be made of various materials; however, they normally would be made of steel using a standard well known fabricating process.

The drawings illustrate a few of the many ways the present double hook chain assembly can be used. For example, in FIG. 2 the grab hook is shown being used merely as a means for shortening the length of the chain for a particular operation. FIG. 3 illustrates the use of the grab hook to shorten the chain by eliminating in the operation the loop indicated by numeral 60. The choker hook is used in the normal manner to connect the chain assembly to another chain 62 having a grab hook 64. Further, the choker hook 20 may be connected to various types of loads, such as a vehicle, and the grab hook 22 used to shorten the effective portion of the chain. The double hook assembly may also be on both ends of the chain.

FIGS. 1 and 2 illustrate the separate use of the two hooks. For example, as seen in FIG. 1, the choker hook may be used separately from the grab hook, with the line of force from the hook to the chain passing in a straight line axially along extension 38. Since the axis of the extension, or the line A between the two holes 40 and 42, is disposed angularly outwardly from the line B between hole 42 and the base of throat 34, loop 32 is held firmly in a noninterfering position when hook 20 and the chain are used alone. Likewise a direct line of force is obtained from the effective portions 66 and 68 of chain 12 when the grab hook is used as a separate hook with choker hook 20 unused. The grab hook construction illustrated in the drawings, consisting of the loop forming the throat and extension 38 on shank 36 with the two holes therein, provides the versatility which permits the wide variety of different chain arrangements for pulling and securing loads. The position of the throats of the two hooks relative to one another may be reversed from that shown in the drawing, i. e., the throat of hook 20 may be on one side of the center line of the chain and the throat of the other hook on the other side of the center line.

While only one embodiment of the present chain and hook assembly has been described in detail herein, various changes and modifications may be made without departing from the scope of the invention.

I claim:

1. A chain hook assembly comprising a first hook having a throat portion and a shank on said portion with a hole therein, a second hook having a throat portion and a shank with two spaced holes therein with one of said holes being disposed nearer the free end of the shank than the other of said holes, the portion of the shank containing said holes being disposed angularly with respect to said throat and to the remainder of the shank and forming a shoulder in said shank intersected by a line through the centers of said holes, a link in the hole in the shank of the first hook and in the hole nearer the free end of the shank of the second hook interconnecting said hooks, and a chain connected to the other of said holes in the shank of said second hook.

2. A chain hook assembly as defined in claims 1 in which said chain consists of a series of oval closed interconnected links.

3. A chain hook assembly as defined in claims 1 in which said second hook is of the grab hook type, the throat of said second hook being sufficiently restricted to receive one link in an edgewise manner and holding said link from sliding laterally therefrom.

4. A chain hook assembly as defined in claims 1 in which said first hook is a choker type hook with a throat sufficiently large to permit the chain to slide through the throat.

* * * * *